(12) United States Patent
Shibasaki

(10) Patent No.: US 8,705,190 B2
(45) Date of Patent: Apr. 22, 2014

(54) METHOD FOR DETERMINING WHETHER DEFECT ON DISK IS RECESS OR PROTRUSION AND MAGNETIC DISK DRIVE

(75) Inventor: Takeshi Shibasaki, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/604,484

(22) Filed: Sep. 5, 2012

(65) Prior Publication Data

US 2013/0335842 A1 Dec. 19, 2013

(30) Foreign Application Priority Data

Jun. 15, 2012 (JP) ................................. 2012-136168

(51) Int. Cl.
*G11B 27/36* (2006.01)
*G11B 5/02* (2006.01)

(52) U.S. Cl.
USPC ............................................... 360/31; 360/25

(58) Field of Classification Search
None
See application file for complete search history.

(56) References Cited

U.S. PATENT DOCUMENTS

| 5,640,089 A | 6/1997 | Horikawa et al. |
| 6,850,377 B2 * | 2/2005 | Hashi et al. ..................... 360/17 |
| 8,427,770 B1 * | 4/2013 | O'Dell et al. .................... 360/25 |
| 2011/0310508 A1 | 12/2011 | Fujii et al. |
| 2013/0100550 A1 * | 4/2013 | Galbraith et al. ............... 360/39 |

FOREIGN PATENT DOCUMENTS

| JP | 08-082504 | 3/1996 |
| JP | 09-259401 | 10/1997 |
| JP | 2011-258273 | 12/2011 |

* cited by examiner

*Primary Examiner* — Regina N Holder
(74) *Attorney, Agent, or Firm* — Knobbe, Martens, Olson & Bear LLP

(57) ABSTRACT

According to one embodiment, there is provided a method for determining whether a defect on a disk in an apparatus includes head is a recess or a protrusion. The method detects a first defect on the disk using a read element provided in the head. The method detects a second defect on the disk using a head disk interference sensor provided in the head. The method further determines whether a third defect is a recessed defect or a protruding defect based on a ratio between a first width of the first defect in a radial direction on the disk and a second width of the second defect in the radial direction of the disk. The third defect is identified based on the first defect and the second defect.

16 Claims, 9 Drawing Sheets

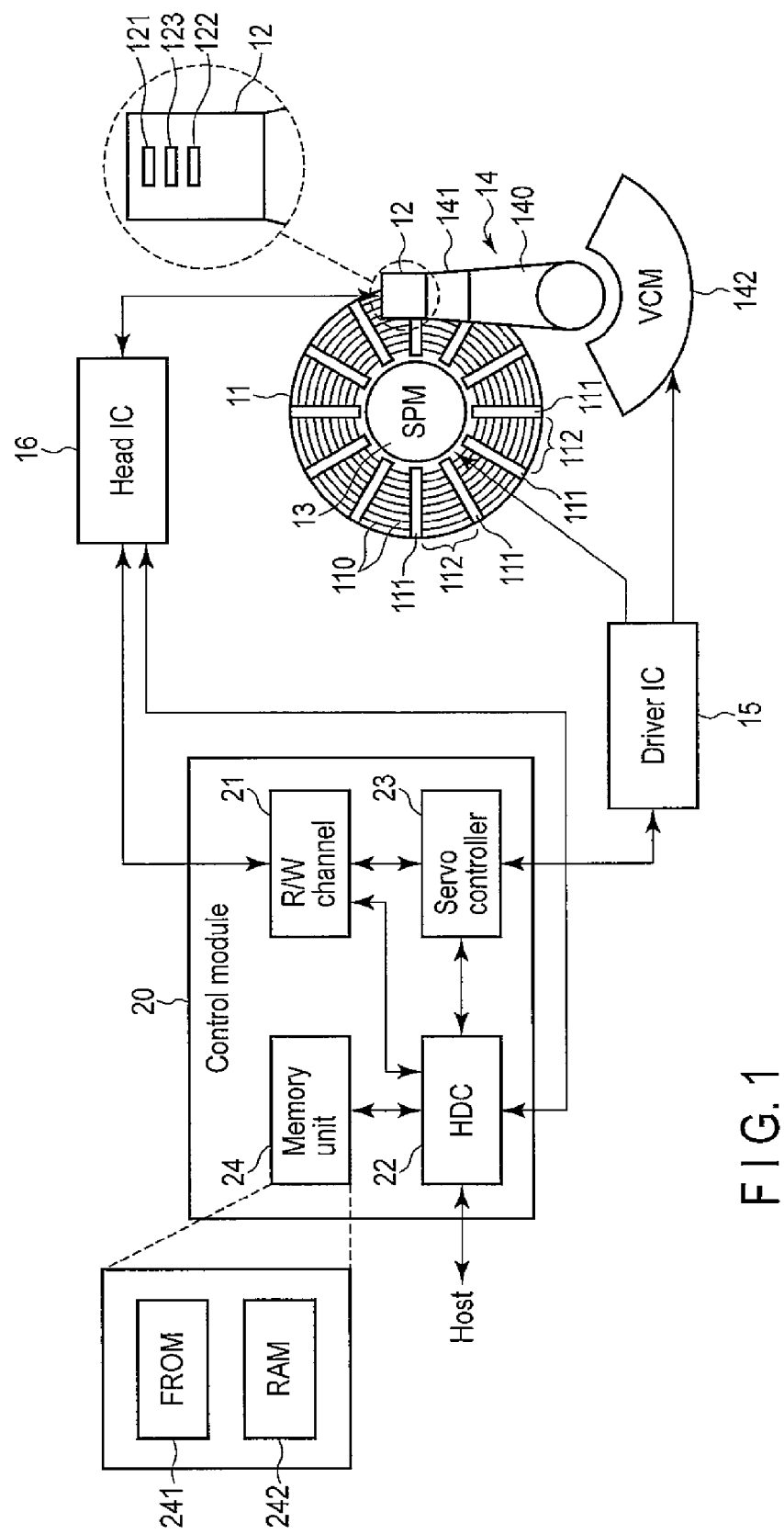
F I G. 1

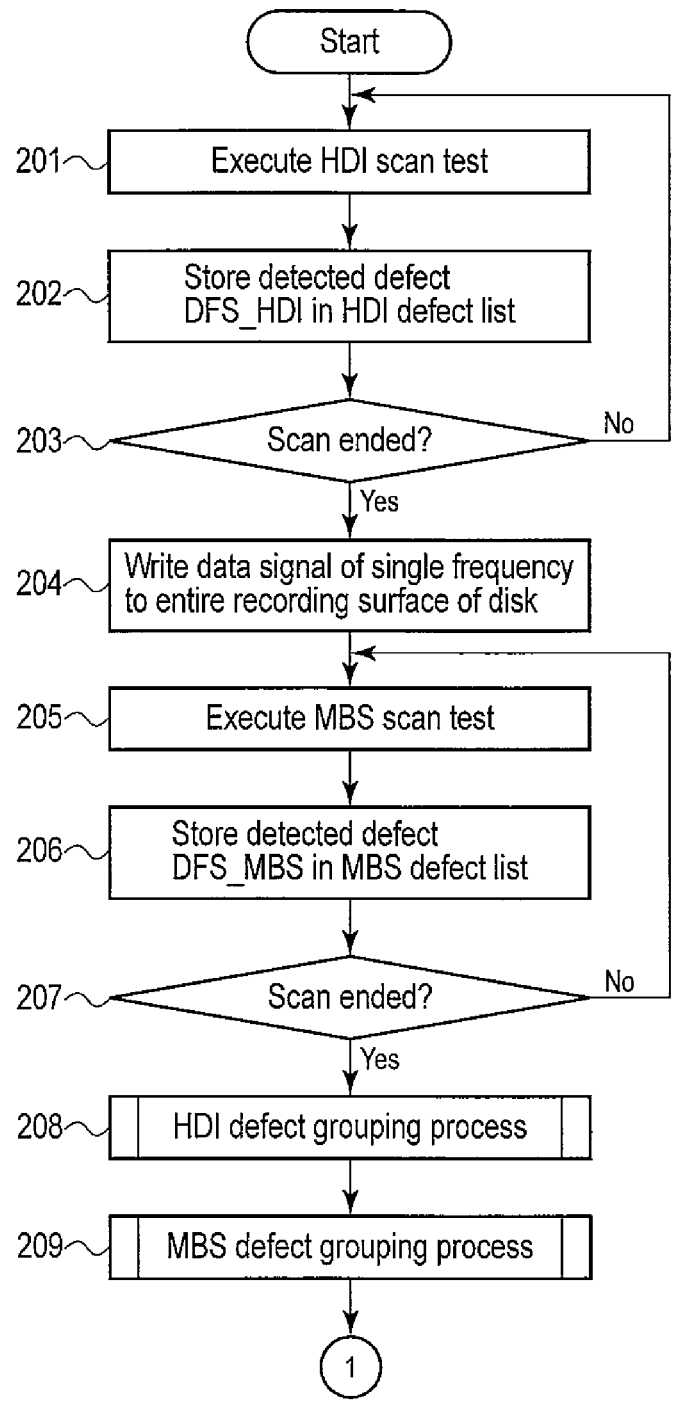
F I G. 2

| Cylinder number | Head number | Sector number | Sector length | Group number |
|---|---|---|---|---|

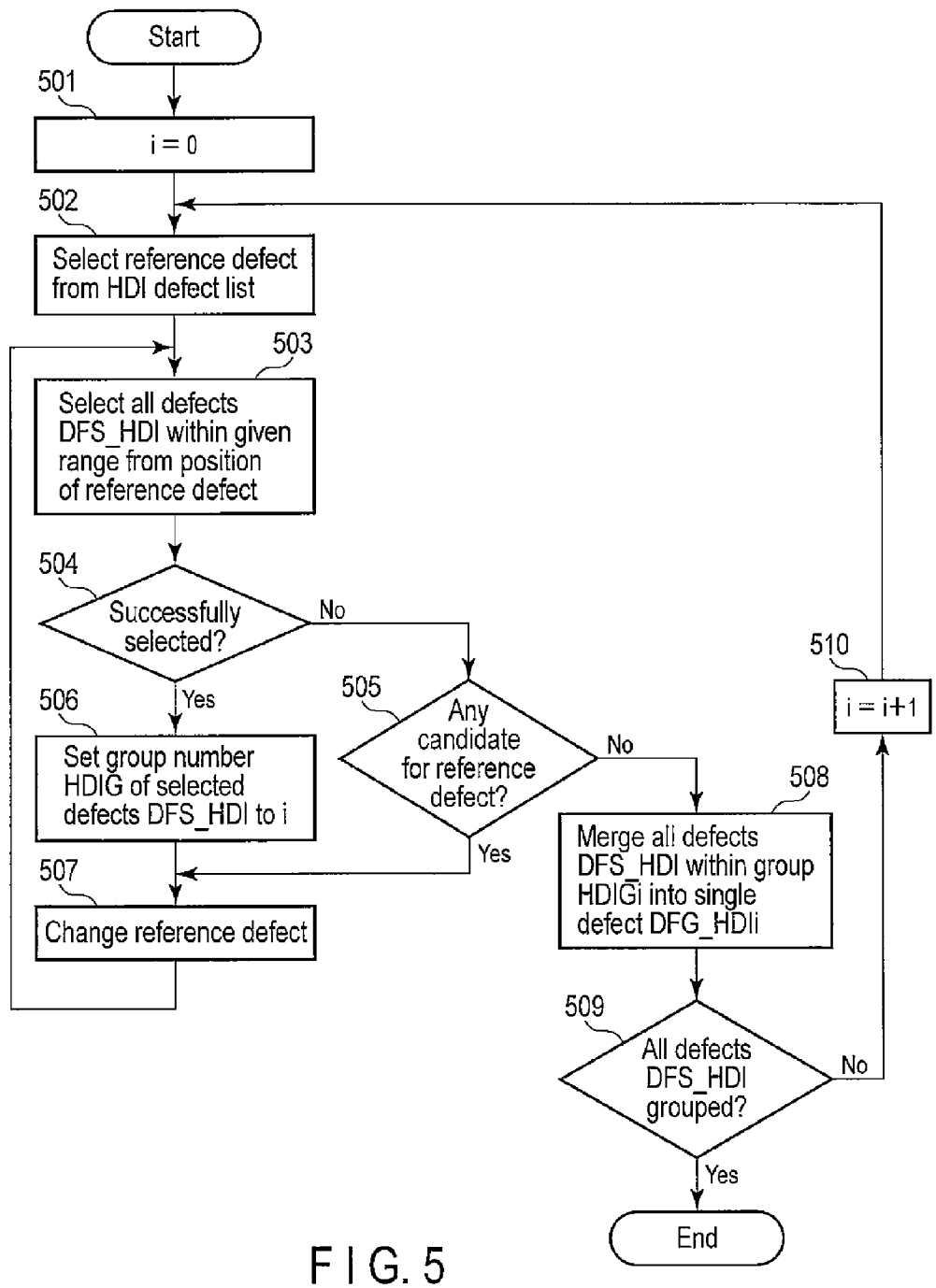
F I G. 5

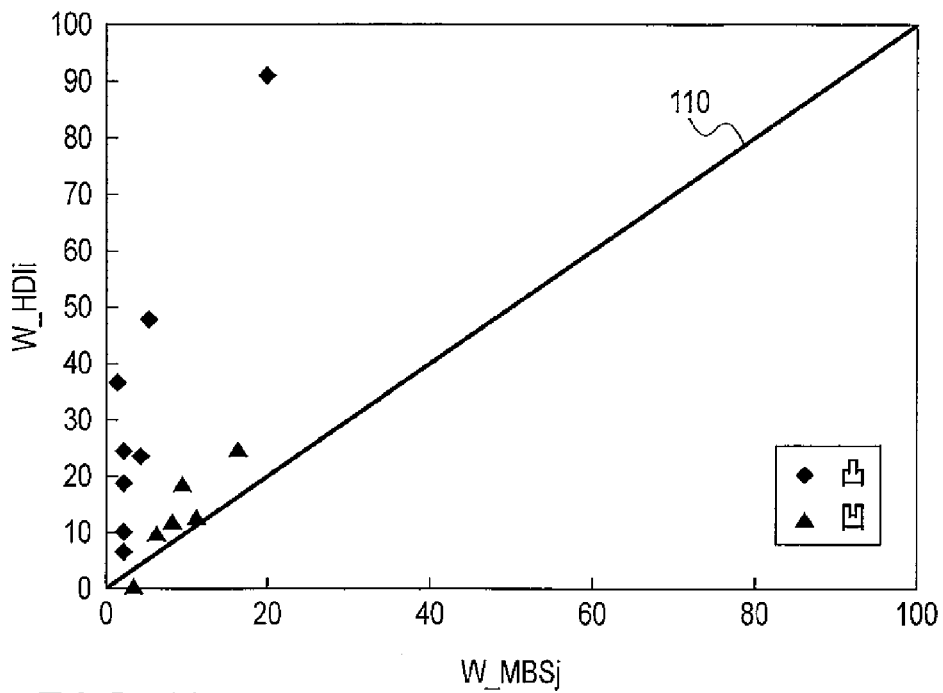
F I G. 11
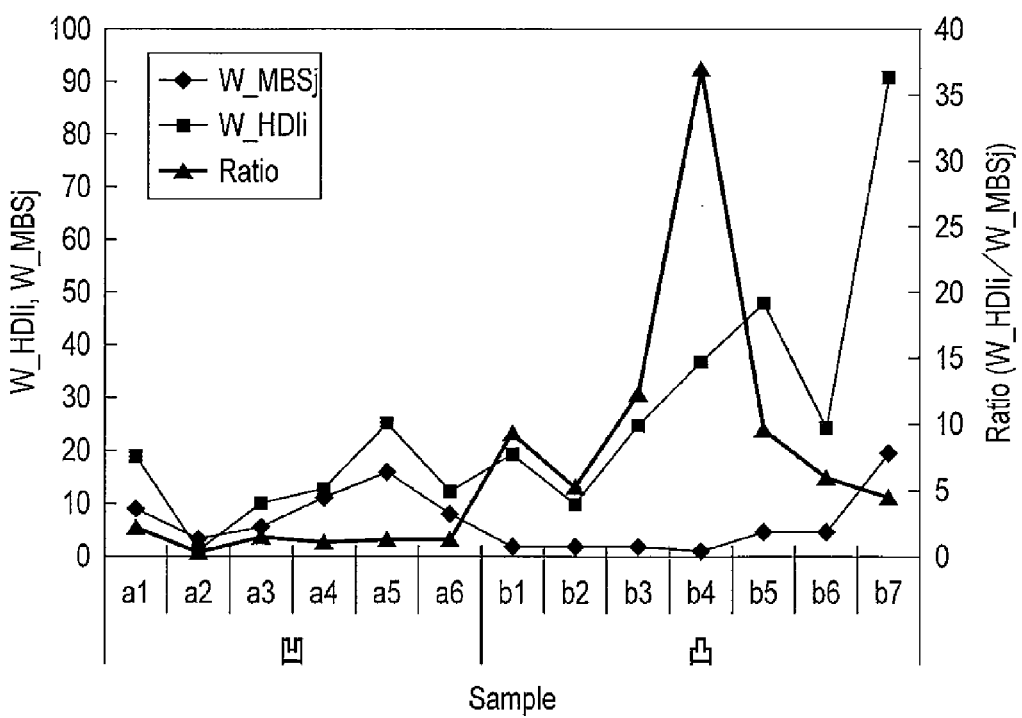
F I G. 12

METHOD FOR DETERMINING WHETHER DEFECT ON DISK IS RECESS OR PROTRUSION AND MAGNETIC DISK DRIVE

CROSS-REFERENCE TO RELATED APPLICATIONS

This application is based upon and claims the benefit of priority from Japanese Patent Application No. 2012-136168, filed Jun. 15, 2012, the entire contents of which are incorporated herein by reference.

FIELD

Embodiments described herein relate generally to a method for determining whether a defect on a disk is a recess or a protrusion and a magnetic disk drive.

BACKGROUND

A magnetic disk drive comprises a disk (more specifically a magnetic disk) as a recording medium. Now, it is assumed that a very small protrusion is present on a surface of the disk. In this case, a head (more specifically a magnetic head) may fail to write data to an area on the disk where the protrusion is present or to read data from the area. Furthermore, the head may collide against the protrusion and be damaged. To avoid such an event, various methods for detecting defects such as protrusions on a disk have been proposed.

However, defects detected according to the conventional technique are not limited to protrusions. That is, according to the conventional technique, a recess in the surface of the disk is also detected as a defect. Thus, the conventional technique detects both protrusions (that is, protruding defects) and recesses (that is, recessed defects) as defects without distinguishing between the recesses and the protrusions. However, the protruding defect and the recessed defect have different degrees of adverse effects in connection with the above-described event. As a result, there has been a demand for a technique for determining whether a detected defect is a recess or a protrusion.

BRIEF DESCRIPTION OF THE DRAWINGS

FIG. 1 is a block diagram showing an exemplary configuration of a magnetic disk drive according to an embodiment;

FIG. 2 is a diagram showing a part of a flowchart illustrating an exemplary procedure for a defect detection and recess/protrusion determination process applied according to the embodiment;

FIG. 5 is a flowchart illustrating an exemplary procedure for a head disk interference (HDI) defect grouping process applied according to the embodiment;

FIG. 11 is a graph showing a plot of the correlation between widths W_MBSj and W_HDIi obtained when a plurality of protruding defects and a plurality of recessed defects are each detected according to the MBS method and the HDI method; and FIG. 12 is a graph showing a plot of the width W_MBSj, the width W_HDIi, and the ratio of the width W_HDIi to the width W_MBSj for each of the plurality of protruding defects and the plurality of recessed defects.

DETAILED DESCRIPTION

Figures 3, 4:
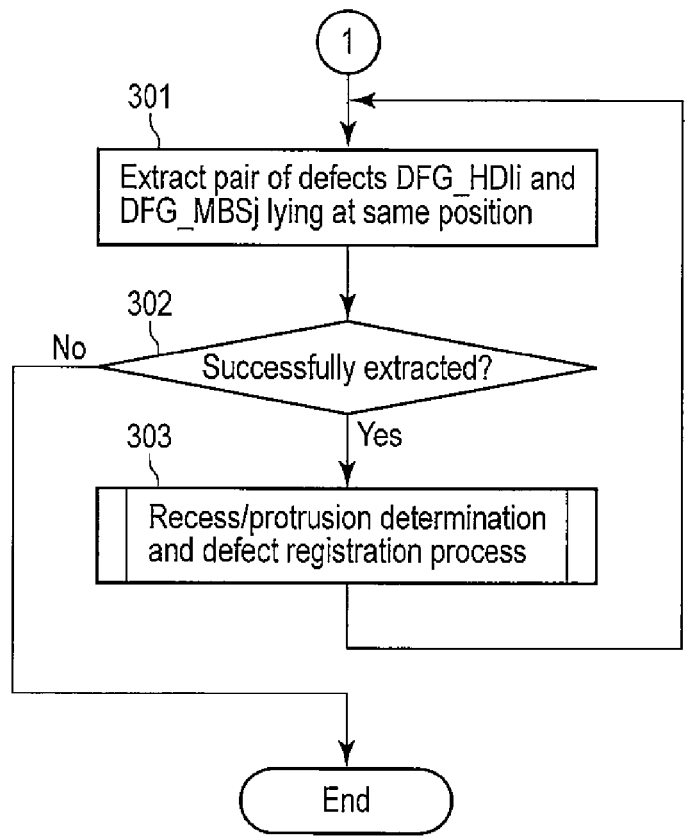
FIG. 3 is a diagram showing the remaining part of the flowchart.
FIG. 4 is a diagram showing an exemplary format of defect information applied according to the embodiment.

Various embodiments will be described hereinafter with reference to the accompanying drawings.

In general, according to one embodiment, there is provided a method for determining whether a defect on a disk in an apparatus comprising head is a recess or a protrusion. The method detects a first defect on the disk using a read element provided in the head. The method detects a second defect on the disk using a head disk interference sensor provided in the head. The method determines whether a third defect is a recessed defect or a protruding defect based on a ratio between a first width of the first defect in a radial direction on the disk and a second width of the second defect in the radial direction of the disk. The third defect is identified based on the first defect and the second defect.

FIG. 1 is a block diagram showing a configuration of a magnetic disk drive according to an embodiment. The magnetic disk drive shown in FIG. 1 comprises a disk (magnetic disk) 11, a head (magnetic head) 12, a spindle motor (SPM) 13, a actuator 14, a driver IC 15, a head IC 16, and a control module 20.

The disk 11 is a magnetic recording medium. The disk 11 comprises a recording surface provided, for example, on one surface thereof and on which data is magnetically recorded. The disk 11 is rotated at high speed by the SPM 13. The SPM 13 is driven by a driving current (or a driving voltage) supplied by the driver IC 15.

The disk 11 (more specifically, the recording surface of the disk 11) comprises a plurality of concentric tracks 110. The disk 11 may comprise a plurality of spirally arranged tracks. The disk 11 further comprises a plurality of servo areas 111. The plurality of servo areas 111 are arranged radially in the radial direction of the disk and discretely at equal intervals in the circumferential direction of the disk 11. The areas between the adjacent servo areas 111 in each track 110 are used as data areas 112. The servo areas 111 in each of the tracks 110 are also referred to as servo frames. Furthermore, an area formed of each of the servo areas 111 in each track 110 and the data areas 112 adjacent to the servo area 111 is referred to as a servo sector. Each of the data areas 112 comprises a plurality of data sectors.

Servo data is recorded in the servo areas 111. The servo data includes a servo mark, address data, and servo burst data. The servo mark comprises a particular code (pattern signal) for use in identifying a corresponding servo sector. The address data comprises the address of the corresponding track 110 (that is, the cylinder address) and the address of the corresponding servo sector (that is, the servo sector address). The servo burst data comprises data (what is called relative position data) for use in detecting misalignment (positional error) of the head 12 with, for example, the center line of the corresponding track 110.

The head (head slider) 12 is arranged in association with the recording surface of the disk 11. The head 12 is attached to a tip of a suspension 141 extending from an arm 140 of the actuator 14. The actuator 14 comprises a voice coil motor (VCM) 142 serving as a driving source for the actuator 14. The VCM 142 is driven by the driving current supplied by the driver IC 15. When the actuator 14 is driven by the VCM 142, this causes the head 12 to move over the disk 11 in the radial direction of the disk 11 so as to draw an arc.

The configuration in FIG. 1 assumes a magnetic disk drive comprising the single disk 11. However, the magnetic disk drive may comprise a plurality of disks 11 stacked therein. Furthermore, in the configuration in FIG. 1, the disk 11 comprises the recording surface on one surface thereof. However, the disk 11 may comprise the recording surface on each of the opposite surfaces thereof, and heads may be arranged in association with the respective recording surfaces.

The head 12 comprises a write element 121, a read element 122, and a head disk interference (interface) sensor 123. The write element 121 is used to write data to the disk 11. The read element 122 is used to read data from the disk 11. The head disk interference (HDI) sensor 123 electrically detects interference acting between the HDI sensor (more specifically, the head 12 comprising the HDI sensor 123) and the disk 11 (that is, the HDI sensor 123 detects an interaction between the HDI sensor and the disk 111), for example, thermal interference.

The HDI sensor 123 comprises, for example, a magnetoresistive (MR) element (not shown in the drawings). The MR element is known to have a resistance value changing significantly according to temperature. The temperature of the HDI sensor 123 changes according to the magnitude of the thermal interference (that is, the thermal interaction) between the HDI sensor 123 and the disk 11. For example, when the head 12 comes into contact with a protrusion (protruding defect) present on the surface of the disk 11, heat is generated between the head 12 (the HDI sensor 123 of the head 12) and the disk 11. Then, the temperature of the HDI sensor 123 changes. Similarly, when the head 12 passes over a recess (recessed defect) present in the surface of the disk 11, heat is also generated between the head 12 and the disk 11. Then, the temperature of the HDI sensor 123 changes. The recess results from, for example, the lack of a part of a film such as a thin magnetic film or a protective film in the surface of the disk 11 or a scratch on the surface.

The resistance value of the HDI sensor 123 (more specifically, the MR element of the HDI sensor 123) changes in response to a change in the temperature of HDI sensor 123. That is, the resistance value of the HDI sensor 123 is indicative of the magnitude of the thermal interference between the HDI sensor 123 and the disk 11. The magnitude of the thermal interference changes according to the state of the surface of the disk 11 which lies opposite the HDI sensor 123. That is, the resistance value of the HDI sensor 123 changes according to the state of the surface of the disk 11. Thus, the HDI sensor 123 is used to detect defects on the disk 11.

The HDI sensor 123 (more specifically, the MR element of the HDI sensor 123) has a width (hereinafter referred to as the HDI sensor width) larger than the read element 122, in the radial direction of the disk 11 (hereinafter referred to as the disk radial direction). That is, if the width of the read element 122 in the disk radial direction (hereinafter referred to as the read element width) is denoted by $W_{RE}$ and the HDI sensor width is denoted by $W_{HDIS}$, then $W_{HDIS} > W_{RE}$. According to the embodiment, $W_{HDIS}$ is more than 10 times as large as $W_{RE}$. However, for convenience of drawing, the difference between the read element width (third width) $W_{RE}$ and the HDI sensor width (fourth width) $W_{HDIS}$ is not reflected in FIG. 1.

The driver IC 15 drives the SPM 13 and the VCM 142 under the control of the control module 20 (more specifically, the servo controller 23 in the control module 20). The head IC 16 is also referred to as a head amplifier and amplifies a signal read by the read element 122 of the head 12 (that is, a read signal). The head IC 16 also converts write data output by the control module 20 (more specifically, an R/W channel 21 in the control module 20 which will be described below) into a write current, and outputs the write current to the write element 121 of the head 12.

The head IC 16 further functions as a part of a second defect detector described below. The head IC 16 detects (that is, monitors) a voltage V_HDIS across the MR element by supplying a predetermined bias current to the MR element of the HDI sensor 123 of the head 12. The voltage V_HDIS is referred to as an HDI sensor voltage. The HDI sensor voltage V_HDIS changes in response to a change in resistance value ρ of the MR element (that is, a change in the temperature of the MR element). Thus, the HDI sensor voltage V_HDIS is indicative of the magnitude of the thermal interference between the HDI sensor 123 and the disk 11. The head IC 16 detects the average level (average voltage) AV_HDIS of the HDIS sensor voltage V_HDIS in units of servo sectors (more specifically, the data areas 112 in the servo sectors) in accordance with a servo sector timing signal described below.

The control module 20 is implemented by a system LSI comprising a plurality of elements integrated on a single chip. The control module 20 comprises a read/write (R/W) channel 21, a hard disk controller (HDC) 22, a servo controller 23, and a memory unit 24.

The R/W channel 21 processes signals related to reads and writes. That is, the R/W channel 21 converts a read signal amplified by the head IC 16 into digital data, and decodes read data from the digital data. The R/W channel 21 also extracts servo data from the digital data. The R/W channel 21 also generates the servo sector timing signal based on the extracted servo data. The servo sector timing signal corresponds to the servo sector including the servo area 111 with the extracted servo data recorded therein (more specifically, the data areas 112 in the servo sector including the servo area 111). The R/W channel 21 also encodes write data transferred by the HDC 22 and transfers the encoded write data to the head IC 16.

The HDC 22 is connected to a host (host device) via a host interface (storage interface). The host utilizes the magnetic disk drive shown in FIG. 1 as the host's own storage device. The host and the magnetic disk drive shown in FIG. 1 are provided in an electronic device such as a personal computer, a video camera, a music player, a portable terminal, a cellular phone, or a printer device. The HDC 22 functions as a host interface controller which transfers signals to the host and which receives signals transferred by the host. Specifically, the HDC 22 receives commands (a write command, a read command, and the like) transferred by the host. The HDC 22 also controls the data transfer between the host and the HDC 22. The HDC 22 also functions as a disk interface controller that controls data writes to the disk 11 and data reads from the disk 11 via the R/W channel 21, the head IC 16, and the head 12.

The HDC 22 further detects defects on the recording surface of the disk 11 in a defect detection and recess/protrusion determination mode. The embodiment uses two methods together to allow the HDC 22 to detect defects.

The first method is to detect defects using the read element 122 of the head 12. More specifically, the first method uses the read element 12 to read a data signal of a single frequency written to the entire recording surface of the disk 11 and detects defects based on the level of the read data signal (that is, the read signal). As described above, the read signal is amplified by the head IC 16, and the amplified read signal is output to the R/W channel 21. The frequency of the data signal corresponds to the length of the bit in the disk circumferential direction (more specifically, the circumferential direction of the disk 11). The bit is the minimum unit of data recording.

The HDC 22 functions as a first defect detector in the defect detection using the first method. The HDC 22 compares the level of the read signal detected by the R/W channel 21 (that is, the read signal amplified by the head IC 16) with a first reference level, for example, in units of bits. Based on the comparison, the HDC 22 determines bits of the read signal which are at a level lower than the first reference level to be errors (what is called missing pulse errors). The HDC 22 determines a data sector with error bits the number of which is greater than a reference number to be a defect (that is, a defective data sector) DFS_MBS. The HDC 22 executes such a determination (that is, defect detection) on all the data sectors in all the tracks 110 on the disk 11. The first method is known as a media bump screening (MBS) method. Thus, the first method is hereinafter referred to as the MBS method.

The second method detects defects using the HDI sensor 123. More specifically, the second method detects defects based on the interference acting between the HDI sensor 123 and the disk 11 (in the embodiment, the thermal interference) and detected by the HDI sensor 123. Thus, the second method is hereinafter referred to as an HDI method.

In the defect detection using the HDI method, the HDC 22 functions as a second defect detector. The HDC 22 compares the average level AV_HDIS detected by the head IC 16 in units of servo sectors (that is, the average level AV_HDIS of the HDI sensor voltage V_HDIS) with a second reference level. Based on the comparison, the HDC 22 determines that a servo sector with an average level AV_HDIS greater than the second reference level to be a defect (that is, a defective data sector) DFS_HDI. In this case, the HDC 22 determines that all the data sectors in the servo sector determined to be a defect (that is, the defect servo sector) are defects (that is, defective data sectors) DFS_HDI. The HDC 22 executes such a determination (that is, defect detection) on all the servo sectors in all the tracks 110 on the disk 11.

The R/W channel 21 may function as a part of the first defect detector and compare the level of the read signal with the first reference level. That is, the first defect detector may be distributed into the R/W channel 21 and the HDC 22. Furthermore, the head IC 16 functioning as a part of the second defect detector may compare the average level AV_HDIS with the second reference level. Alternatively, the R/W channel 21 may function as a part of the second defect detector and compare the average level AV_HDIS with the second reference level. Moreover, the R/W channel 21 may detect the average level AV_HDIS. That is, the second defect detector may be distributed into the head IC 16, the R/W channel 21, and the HDC 22 or into the R/W channel 21 and the HDC 22.

The HDC 22 further functions as a grouping module in the defect detection and recess/protrusion determination mode. Based on the results of the defect detection using the MBS method, the HDC 22 groups defective data sectors DFS_MBS into defects DFG_MBS (first defects). This grouping is referred to as first defect grouping. Each of the defects DFG_MBS is a set of the defective data sectors DFS_MBS.

Furthermore, based on the defect detection using the HDI method, the HDC 22 groups defective data sectors DFS_HDI into defects DFG_HDI (second defects). This grouping is referred to as second defect grouping. Each of the defects DFG_HDI is a set of the defective data sectors DFS_HDI. Algorithms for the first and second groupings will be described below.

The HDC 22 further functions as a defect recess/protrusion determination module in the defect detection and recess/protrusion determination mode. That is, in the defect detection and recess/protrusion determination mode, based on the result of the first grouping and the result of the second grouping, the HDC 22 determines whether a defect common to both results is a recess or a protrusion. An algorithm for the recess/protrusion determination will be described below.

The servo controller 23 controls the SPM 13 and the VCM 142 via the driver IC 15. In particular, in order to position the head 12 at a target position in the target track 110 on the disk 11, the servo controller 23 controls the VCM 142 based on servo data extracted by the R/W channel 21. Here, controlling the VCM 142 is equivalent to controlling the actuator 14 comprising the VCM 142.

According to the embodiment, each of the HDC 22 and the servo controller 23 comprises a microprocessor unit (MPU). The MPUs execute control programs for the HDC 22 and the servo controller 23 to provide the functions of the HDC 22 and the servo controller 23, respectively. The control programs are stored in a FROM 241 described below. Alternatively, a single MPU may execute the control programs in a time division manner.

The memory unit 24 comprises the flash ROM (FROM) 241 and a RAM 242. The FROM 241 is a rewritable nonvolatile memory. A control program (firmware) for implementing the functions of control module 20 including the HDC 22 and the servo controller 23 is pre-stored in a part of the storage area of the FROM 241.

Another part of the storage area of the FROM 241 is used to save the results of the defect detections using the MBS method and the HDI method, for example, in a list form. A list describing the results of the defect detection using the MBS method is hereinafter referred to as an MBS defect list (first defect list). A list describing the results of the defect detection using the HDI method is hereinafter referred to as an HDI defect list (second defect list). Yet another part of the storage area of the FROM 241 is used to store defect areas for which reads and writes are to be avoided. At least a part of the storage area of the RAM 242 is used as a work area for the HDC 22 and the servo controller 23.

Now, the operation of the embodiment will be described with reference to FIG. 2 and FIG. 3 taking as an example a process of detecting a defect on the disk 11 and determining whether the detected defect is a recess or a protrusion (the process is hereinafter referred to as a defect detection and recess/protrusion determination process). FIG. 2 shows a part of a flowchart illustrating an exemplary procedure for the defect detection and recess/protrusion determination process applied according to the embodiment. FIG. 3 shows the remaining part of the flowchart.

Now, the magnetic disk drive in FIG. 1 is assumed to need to detect a defect on the disk and to determine whether the detected defect is a recess or a protrusion. In this case, the HDC 22 sets the magnetic disk drive in the defect detection and recess/protrusion determination mode. Then, the HDC 22 starts the defect detection and recess/protrusion determination process shown in the flowcharts in FIG. 2 and FIG. 3.

First, the HDC 22 functions as the second defect detector and executes a disk scan test for detect a defect on the disk 11 using the HDI method (the disk scan test id hereinafter referred to as an HDI scan test) (block 201). In the HDI scan test, in accordance with an instruction from the HDC 22, the servo controller 23 drives the actuator 14 via the driver IC 15 so as to allow the head 12 to scan the entire recording surface of the disk 11 for each track 110 (cylinder). The cylinder and servo sector on the disk 11 where the head 12 is positioned is indicated by the cylinder address and servo sector address in the servo data. The servo data is extracted by the R/W channel 21 from data read by the read element 122 of the head 12.

The HDI sensor 123 generates an HDI sensor voltage V_HDIS corresponding to the magnitude of the thermal interference between the HDI sensor 123 and the disk 11. As described above, the thermal interference changes according to the state of the surface of the disk 11 which lies opposite the HDI sensor 123 (for example, whether the surface of the disk 11 is a recess or a protrusion). The head IC 16 functions as a part of the second defect detector for the HDI sensor 123 to monitor the HDI sensor voltage V_HDIS of the HDI sensor 123. The head IC 16 detects the average level AV_HDIS of the HDI sensor voltage V_HDIS in units of servo sectors in accordance with the servo sector timing signal output by the R/W channel 21.

In the HDI scan test, the HDC 22 compares the average level AV_HDIS detected by the head IC 16 with the second reference level in units of servo sectors. Based on this comparison, the HDC 22 determines whether or not the corresponding servo sector is a defect. If the servo sector is the defect, the HDC 22 determines that all the data sectors in the servo sector are defects DFS_HDI (that is, the HDC 22 detects the defects).

The HDC 22 stores information on the detected defects DFS_HDI (defect information) in the HDI defect list in the FROM (block 202). According to the embodiment, the defect information is stored in units of tracks 110 and in units of sets of contiguous defects DFS_HDI on the track 110. The HDI defect list is initialized at the beginning of the defect detection and recess/protrusion determination process. Furthermore, at the beginning of the defect detection and recess/protrusion determination process, the MBS defect list in the FROM 241 is also initialized.

FIG. 4 shows an exemplary format for the defect information applied according to the embodiment. According to the embodiment, the format of the defect information stored in the HDI defect list is identical to the format of the defect information stored in the MBS defect list. The defect information applied according to the embodiment includes a cylinder number, a head number, a sector number, a sector length, and a group number.

The cylinder number (cylinder address) in the defect information is indicative of the cylinder position of a track 110 on the disk 11 where the corresponding defect is present. The head information in the defect information is indicative of a recording surface on the disk 11 where the corresponding defect is present. The head number is not necessarily required for a magnetic disk drive comprising a single disk 11 and in which the disk 11 comprises a recording surface on only one disk surface thereof as in the case of the embodiment.

The sector number and sector length in the defect information vary slightly between a first case and a second case described below. In the first case, a defect to be indicated by the defect information is present in a single data sector on the track 110, and thus the defect has a single defective data sector. The HDI scan test applied according to the embodiment does not involve the first case. In the second case, a defect indicated by the defect information extends over n (n is an integer greater than one) contiguous data sectors on the track 110, and thus the defect has n defect sectors. The HDI scan test applied according to the embodiment involves only the second case.

In the first case, the sector number and sector length in the defect information are indicative of the position of the above-described single data sector (that is, the defective data sector) and the number N of data sectors included in the defect (that is, N=1). In the second case, the sector number in the defect information is indicative of the leading one of the n defective data sectors and the number N of data sectors included in the defect (that is, N=n). The group number in the defect information is indicative of a group to which the defect to be indicated by the defect information (that is, at least one defective data sector) belongs. The group will be described below.

If the HDI scan test (block 201) detects at least one defect in the track 110 (TR) at which the head 12 is positioned, the HDC 22 stores defect information in a format shown in FIG. 4 in the HDI defect list for each defect on the track 110 (TR) (block 202). Storing the defect information is equivalent to storing the defective data sector DFS_HDI detected in the HDI scan test in the HDI defect list. According to the embodiment, the sequence of elements (defect information) in the HDI defect list is equal to the order of registrations.

Upon executing block 202, the HDC proceeds to block 203. In contrast, if the HDI scan test (block 201) detects no defect in the track 110 (TR), the HDC 22 skips block 202 and proceeds to block 203.

In block 203, the HDC 22 determines whether the HDI scan test has ended depending on whether the track 110 (TR) is the final track on the disk 11. If the HDI scan test has not ended (No in block 203), the HDC 22 allows the servo controller 23 to move the head 12 to the next track 110 (TR+1) and continues the HDI scan test (block 201).

In contrast, if the HDI scan test has ended (Yes in block 203), the HDC 22 functions as the first defect detector. For the sake of the MBS scan test, the HDC 22 allows the write element 121 of the head 12 to write a data signal of a single frequency to the entire recording surface of the disk 11 (block 204). That is, the HDC 22 allows the write element 121 of the head 12 to write the data signal of the single frequency to each of the data areas 112 in all the tracks 110 of the disk 11 while allowing the servo controller 23 to move the head 12 in the radial direction of the disk 11.

Then, the HDC 22 executes a disk scan test for detecting a defect on the disk 11 using the MBS method (the disk scan test is hereinafter referred to as the MBS scan test) (block 205). In the MBS scan test, in accordance with an instruction from the HDC 22, the servo controller 23 drives the actuator 14 via the driver IC 15 so as to allow the head 12 to scan the entire recording surface of the disk 11 in units of tracks 110 (cylinders).

In the MBS scan test, the read element 122 of the head 12 reads the data signal of the single frequency written to the track 110 (TR) of the disk 11. The read data signal (that is, the read signal) is amplified by the head IC 16. The amplified read signal is transferred to the HDC 22 via the R/W channel 21.

As described above, the HDC 22 determines whether the corresponding bit is an error by comparing the level of the read signal with the first reference level on a bit-by-bit basis. The HDC 22 determines a data sector with error bits the number of which is greater than the reference number to be a defective data sector DFS_MBS (the HDC 22 detects the defective data sector DFS_MBS).

In the MBS scan test (block 205), it is assumed that the HDC 22 detects at least one defective data sectors DFS_MBS in the track 110 (TR). That is, it is assumed that the HDC 22 detects, in the track 110 (TR), at least one defect including a single defective data sector DFS_MBS or n contiguous defective data sectors DFS_MBS. In this case, the HDC 22 stores defect information in the format shown in FIG. 4 in the MBS defect list for each defect on the track 110 (TR) (block 206). Storing the defect information is equivalent to storing the defect (defective data sector) DFS_MBS detected in the MBS scan test in the MBS defect list. According to the embodiment, the sequence of elements (defect information) in the MBS defect list is equal to the order of registrations.

Upon executing block 206, the HDC 22 proceeds to block 207. In contrast, if the MBS scan test (block 205) detects no defect in the track 110 (TR), the HDC 22 skips block 206 and proceeds to block 207.

In block 207, the HDC 22 determines whether the MBS scan test has ended depending on whether the track 110 (TR) is the final track on the disk 11. If the MBS scan test has not ended (No in block 207), the HDC 22 allows the servo controller 23 to move the head 12 to the next track 110 (TR+1) and continues the HDI scan test (block 205). The MBS scan test (205) and the HDI scan test (201) may be executed in parallel.

On the other hand, if the MBS scan test has ended (Yes in block 207), the HDC 22 functions as the grouping module. The HDC 22 executes an HDI defect grouping process (block 208). Then, the HDC 22 executes an MBS grouping process (block 209). Blocks 208 and 209 may be executed in reverse order.

The HDI defect grouping process (block 208) will be described below with reference to FIG. 5 and FIG. 7. FIG. 5 is a flowchart illustrating an exemplary procedure for the HDI defect grouping process (second defect grouping process). FIG. 7 is a diagram illustrating HDI defect grouping. For simplification, in the flowchart in FIG. 5, the defective data sector DFS_HDI is represented as the defect DFS_HDI.

First, the HDC 22 sets a variable i indicative of a group number HDIG to an initial value 0 (block 501). Then, the HDC 22 selects a reference defect from the HDI defect list in the FROM 241 (block 502). The first selection in the HDI defect grouping process selects, as the reference defect, the leading defective data sector DFS_HDI indicated by the leading element (defect information) in the HDI defect list. It is assumed herein that the reference defect is a defective data sector DFS_HDI present at a position on the disk 11 which is indicated by a cylinder number x, a head number 0, and a sector number x. For simplification, the position of the defective data sector DFS_HDI is hereinafter indicated only by the cylinder number and the sector number. Furthermore, a position on the disk 11 indicated by the cylinder number x and the sector number y is expressed as (x, y). Moreover, a cylinder with the cylinder number x and a sector with the sector number y are expressed as a cylinder x and a sector y, respectively.

Upon selecting the reference defect (block 502), the HDC 22 proceeds to block 503. In block 503, the HDC 22 selects all defective data sectors DFS_HDI present within a given range from the position of the reference defect (that is, the position (x, y) denoted by the cylinder number x and the sector number y) based on the HDI defect list (block 503). According to the embodiment, the given range from the position (x, y) refers to within a threshold value THa from the position (x, y) in a cylinder direction (for example, in the direction in which the cylinder number increases) and a threshold value THb from the position (x, y) in a sector direction (for example, in the direction in which the sector number increases). The threshold value THa is indicative of the number of cylinders. The threshold value THb is indicative of the number of sectors (more specifically, the number of data sectors). That is, the HDC 22 selects all the defective data sectors DFS_HDI in the sectors y to y+THb included in each of the cylinders x to x+THa. As is well known, the cylinder direction corresponds to the radial direction of the disk 11. The sector direction corresponds to the circumferential direction of the disk 11.

Figure 7A:
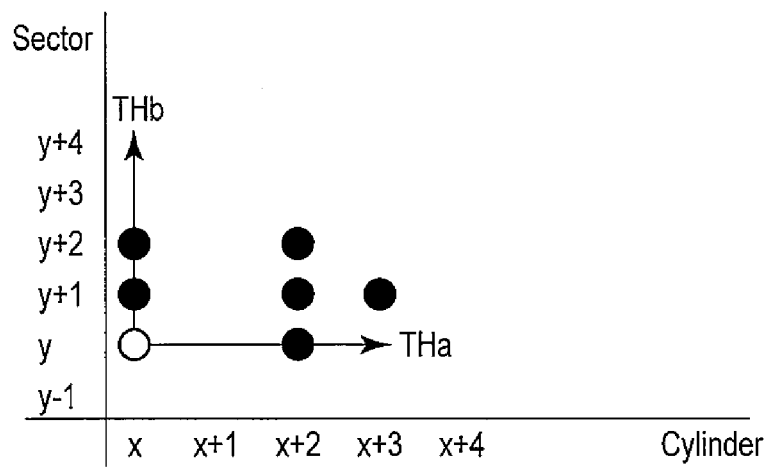
FIG. 7A and FIG. 7B are diagrams illustrating HDI defect grouping applied according to the embodiment.

FIG. 7A shows an example of a defective data sector DFS_HDI selected as described above. In FIG. 7A one circular blank symbol is indicative of the reference defect located at the position (x, y). Six circular filled-in symbols are indicative of six defective data sectors DFS_HDI other than the reference defect which are selected from the sectors y to y+THb included in each of the cylinders x to x+THa.

Upon executing block 503, the HDC 22 determines whether the defective data sectors DFS_HDI can have been selected (block 504). If the result of the determination in block 504 is Yes, the HDC 22 proceeds to block 506. In block 506, the HDC 506 accesses defect information on defects including the selected defective data sectors DFS_HDI. The defect information is stored in the HDI defect list. Then, the HDC 22 sets the group number HDIG in the defect information to i. Thus, the HDC 22 groups the selected all defective data sectors DFS_HDI into a group DFG_HDIi with a group number HDIG of i. Defects indicated by defect information with the group number already set to i are hereinafter referred to as grouped defects.

Now, it is assumed that some or all of the selected defective data sectors DFS_HDI are included in the grouped defects. In this case, the HDC 22 need not necessarily set the group number HDIG already set to i to again. That is, all the grouped defective data sectors DFS_HDI need not necessarily be grouped again.

Then, the HDC 22 changes the reference defect to one of the selected defective data sectors DFS_HDI other than the reference defect (block 507). The HDC 22 then executes blocks 503 and 504 again. If all the defective data sectors DFS_HDI are present within a given range from the new reference defect, all the defective data sets DFS_HDI present within the given range are selected (block 503). If any already selected defective data sector DFS_HDI is present within the given range, the HDC 22 may not select the already selected data sector DFS_HDI or may select the already selected data sector DFS_HDI again. Here, it is assumed that the already selected defective data sector DFS_HDI is not selected.

On the other hand, if the result of the determination in block 504 is No, the HDC 22 proceeds to block 505. In block 505, the HDC 22 determines whether at least one of the defective data sectors DFS_HDI selected in block 503 preceding the current block 503 has not been used as the reference defect yet (that is, whether there is at least one candidate for the reference defect). If the result of the determination in block 505 is Yes, the HDC 22 changes the reference defect to one of the candidates (block 507). Then, the HDC 22 executes blocks 503 and 504 again.

In contrast, if the result of the determination in block 505 is No, the HDC 22 proceeds to block 508. In block 508, the HDC 202 identifies all the defective data sectors DFS_HDI in the group HDIGi with the group number HDIG of i by referencing the HDI defect list. Then, the HDC 22 merges all the defective data sectors DFS_HDI in the group HDIGi into a single defect DFG_HDIi.

Block 508 is provided to illustrate the relationship between the single defect DFG_HDIi and all the defective data sectors DFS_HDI in the group HDIGi. Block 508 need not necessarily be executed. This is because executing block 506, that is, grouping the selected all data sectors DFS_HDI into the group HDIGi is equivalent to merging all the selected defective data sectors DFS_HDI into the defect DFG_HDIi.

Figure 7B:
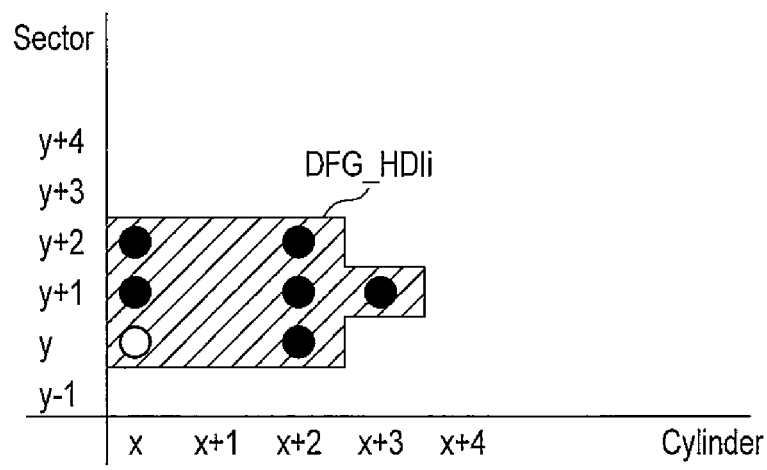

The embodiment assumes that whichever of the six defective data sectors DFS_HDI shown as the filled-in circles in FIG. 7A is used as the reference defect, no new defective data sector DFS_HDI is selected. In this case, only the seven defective data sectors DFS_HDI shown in FIG. 7A are grouped into the group HDIGi. That is, the seven defective data sectors DFS_HDI are merged into a single defect DFG_HDIi as shown in FIG. 7B.

Upon executing block 508, the HDC 22 proceeds to block 509. In block 509, the HDC 22 determines whether all the defective data sectors DFS_HDI indicated by all the elements in the HDI defect list have been grouped. If the result of the determination in 509 is No, the HDC 22 increments the variable i by one (block 510), and returns to block 502. In contrast, if the result of the determination in 509 is Yes, the HDC 22 ends the HDI defect grouping process (block 208). The HDC 22 executes the MBS defect grouping process as described above (block 209).

Figure 6:
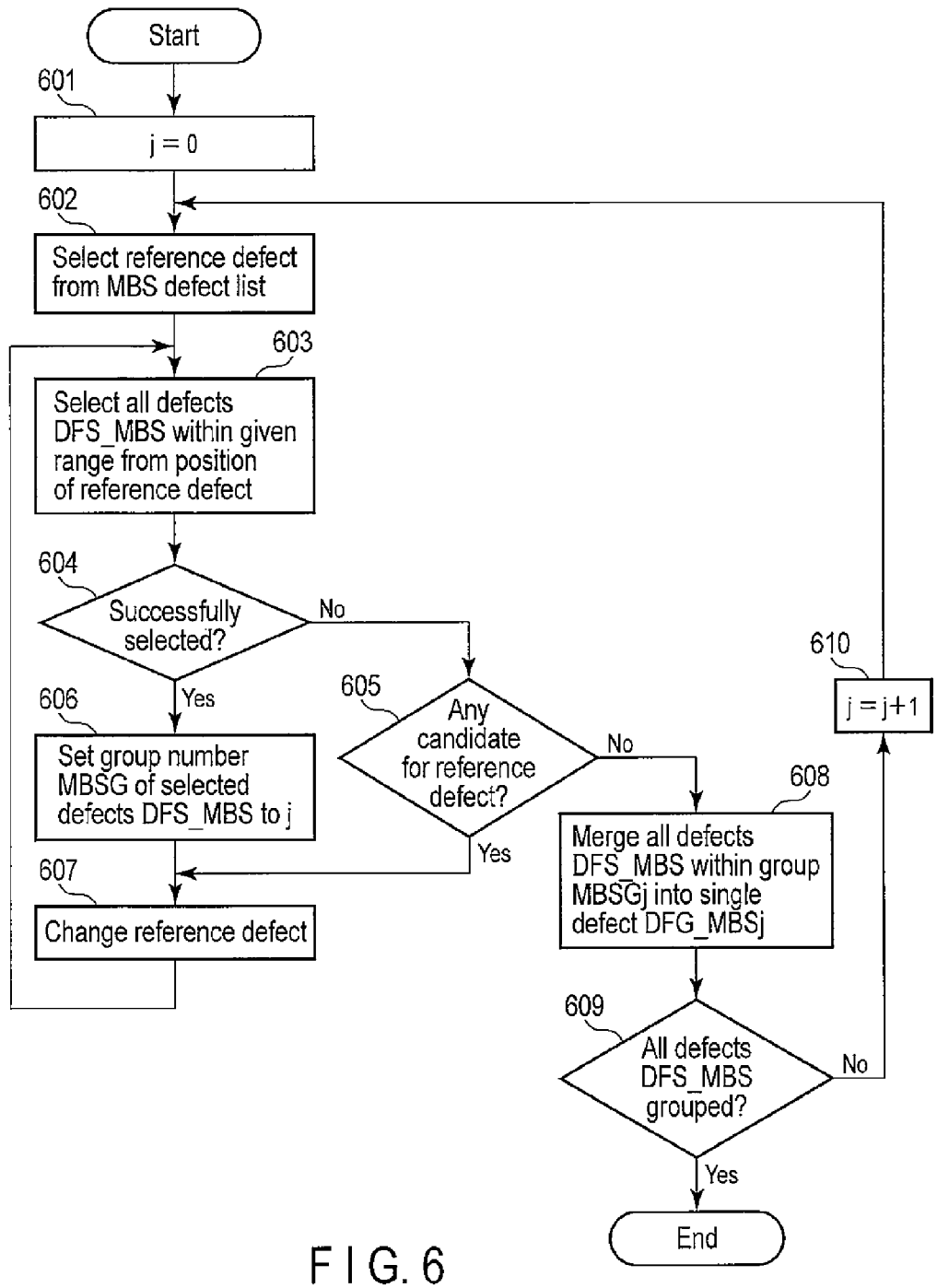
FIG. 6 is a flowchart illustrating an exemplary procedure for a media bump screening (MBS) defect grouping process applied according to the embodiment.

The MBS defect grouping process (block 209) will be described below in brief with reference to FIG. 6 and FIG. 8. FIG. 6 is a flowchart illustrating an exemplary procedure for the MBS defect grouping process (first grouping process). FIG. 8 is a diagram illustrating MBS defect grouping. For simplification, in the flowchart in FIG. 6, the defective data sector DFS_MBS is expressed as defect DFS_MBS.

The procedure for the MBS defect grouping process shown in the flowchart in FIG. 6 is similar to the HDI defect grouping process shown in the flowchart in FIG. 5. Thus, the procedure for the MBS defect grouping process will not be described. If necessary, in the above description (that is, the description of the HDI defect grouping process), blocks 501 to 510 should be replaced with blocks 601 to 610. Furthermore, in the above description, the variable i should be a variable j, and the HDI defect list should be replaced with the MBS defect list. Furthermore, in the above description, the defective data sector DFS_HDI, the group HDIGi, and the defect DFG_HDIi should be replaced with the defective data sector DFS_MBS, the group MBSGj, and the defect DFG_MBSj.

Figure 8A:
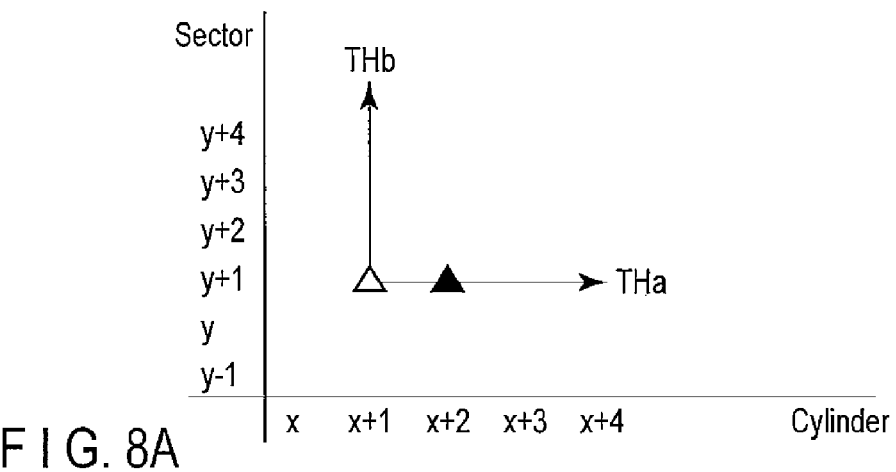
FIG. 8A and FIG. 8B are diagrams illustrating MBS defect grouping applied according to the embodiment.

FIG. 8A shows an example of the defective data sector DFS_MBS selected in block 602. In FIG. 8A, one triangular blank symbol indicates the reference defect located at a position (x+1, y+1). One triangular filled-in symbol indicates one defective data sector DFS_MBS other than the reference defect which is selected from sectors y+1 to y+1+THb included in each of cylinders x+1 to x+1+THa.

The embodiment assumes that when the defective data sectors DFS_MBS shown as the filled-in triangle in FIG. 8A is used as the reference defect, no new defective data sector DFS_MBS is selected. In this case, only the two defective data sectors DFS_MBS shown in FIG. 8A are grouped into the group MBSGi. That is, the two defective data sectors DFS_MBS are merged into a single defect DFG_MBSj as shown in FIG. 8B.

Upon executing the MSB defect grouping process (block 209), the HDC 22 functions as an extraction module. Then, based on the HDI defect list and MBS defect list in the FROM 241, the HDC 22 extracts the pair of the defect DFG_HDIi and the defect DFG_MBSj which are present at the same position on the disk 11 (block 301). According to the embodiment, the HDC 22 determines that the defect DFG_HDIi and the defect DFG_MBSj are present at the same position if the range of the defect DFG_HDIi and the range of the defect DFG_MBSj have an overlapping portion.

Figure 8B:
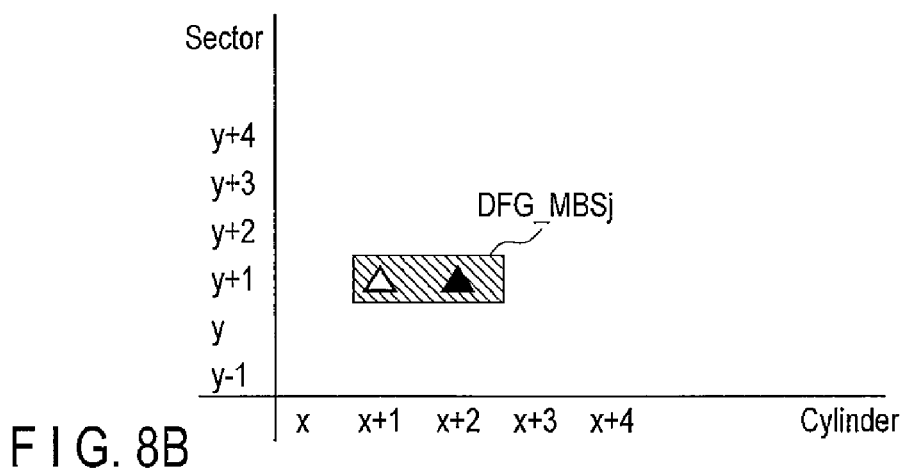
Figure 9:
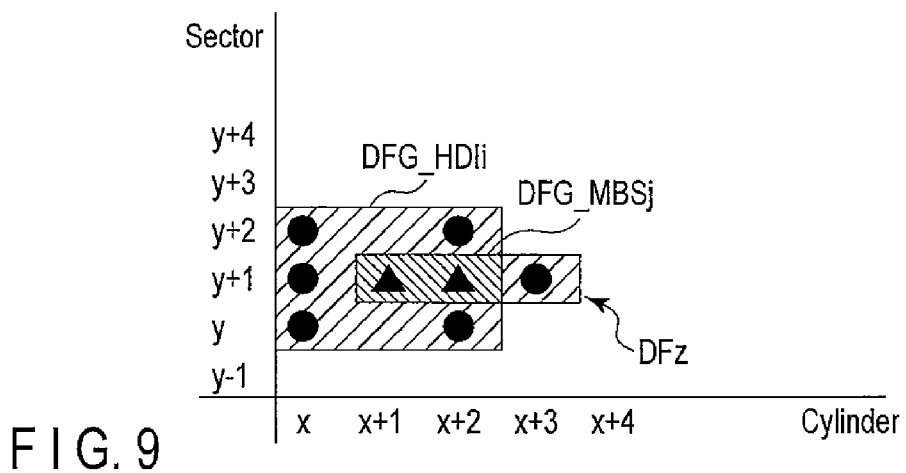
FIG. 9 is a diagram showing the positional relationship between defects shown in FIG. 7B and defects shown in FIG. 8B.

FIG. 9 shows the positional relationship between the defect DFG_HDIi shown in FIG. 7B and the defect DFG_MBSj shown in FIG. 8B. The range of the defect DFG_HDIi and the range of the defect DFG_MBSj shown in FIG. 9 have an overlapping portion. Consequently, the pair of the defect DFG_HDIi and defect DFG_MBSj shown in FIG. 9 is extracted as a defect lying at the same position. Thus, the defect DFG_HDIi (second defect) and the defect DFG_MBSj (first defect), which are otherwise a single defect (third defect) lying at the same position, are determined to be defects of different shapes due to different defect detection methods applied. Hence, the pair of the defects DFG_HDIi and DFG_MBSj is merged into a single defect DFz as described below.

Upon executing block 301, the HDC 22 determines whether the pair of the defects DFG_HDIi and DFG_MBSj can have been extracted (block 302). If the result of the determination in block 302 is Yes, the HDC 22 functions as the defect recess/protrusion determination module and the defect registration module. Then, based on the extracted defect DFG_HDIi and defect DFG_MBSj, the HDC 22 executes a recess/protrusion determination and defect registration process (block 303). Then, the HDC 22 returns to block 301. In contrast, if the result of the determination in block 302 is No, the HDC 22 ends the defect detection and recess/protrusion determination process.

Figure 10:
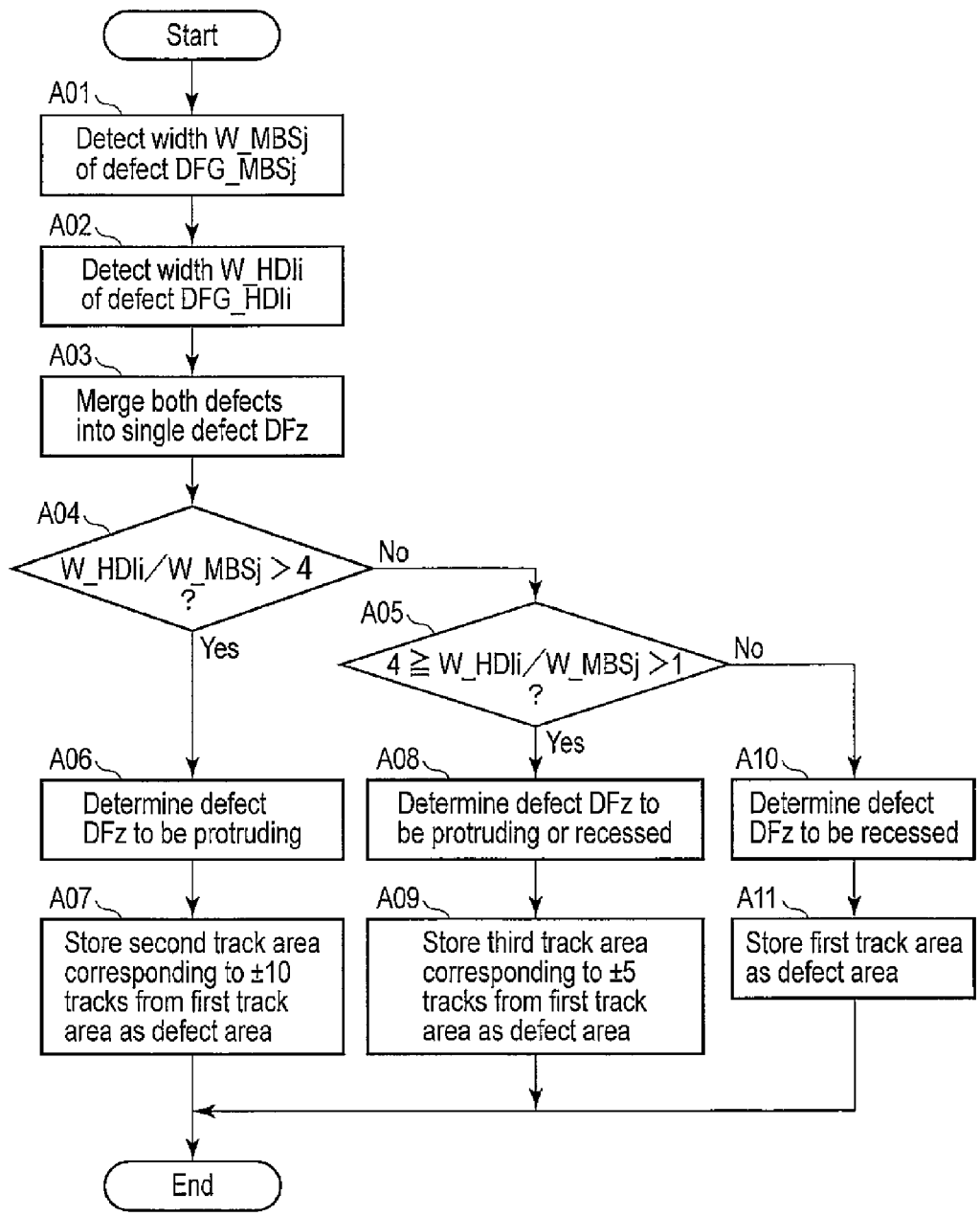
FIG. 10 is a flowchart illustrating an exemplary procedure for a recess/protrusion determination and defect registration process applied according to the embodiment.

Now, the recess/protrusion determination and defect registration process (block 303) will be described with reference to FIG. 10. FIG. 10 is a flowchart illustrating an exemplary procedure for the recess/protrusion determination and defect registration process applied according to the embodiment.

First, the HDC 22 detects the width (first width) W_MBSj of one of the extracted defects DFG_HDIi and DFG_MBSj, for example, the defect DFG_MBSj, in the cylinder direction, based on the MBS defect list in the FROM 241 (block A01). According to the embodiment, the width W_MBSj is expressed as the number of cylinders (tracks). For example, the width W_MBSj of the defect DFG_MBSj shown in FIG. 9 is two (two cylinders).

Then, the HDC 22 detects the width (second width) W_HDIi of the extracted defect DFG_HDIi in the cylinder direction based on the HDI defect list in the FROM 241 (block A02). According to the embodiment, the width W_HDIi is expressed as the number of cylinders (tracks) similarly to the width W_MBSj. For example, the width W_HDIi of the defect DFG_HDIi shown in FIG. 9 is four (four cylinders). Blocks A01 and A02 may be executed in reverse order.

Then, the HDC 22 merges the extracted defects DFG_HDIi and DFG_MBSj into the single defect DFz as shown in FIG. 9 (block A03). The HDC 22 considers the defect DFz to correspond to a defect lying at the same position and detected by the HDI method and the MBS method (a third defect).

Then, the HDC 22 calculates the ratio W_HDIi/W_MBSj of the width W_HDIi of the defect DFG_HDIi to the width W_MBSj of the defect DFG_MBSj. Then, as described below in detail, based on the ratio W_HDIi/W_MBSj, the HDC 22 determines whether the defect DFz is a protruding defect or a recessed defect.

The reason why whether the defect DFz is a recess or a protrusion is determined based on the ratio W_HDIi/W_MBSj will be described with reference to FIG. 11 and FIG. 12. FIG. 11 is a graph showing a plot of the correlation between the width W_MBSj and the width W_HDIi obtained when a plurality of protruding defects and a plurality of recessed defects are each detected according to the MBS method and the HDI method. Here, whether defects (that is, defects on the disk 11) are recessed or protruding were determined by the inventor microscopically observing the surface state of a position on the disk 11 indicated by the corresponding defect information. In FIG. 11, the axis of abscissas indicates the width W_MBSj, and the axis of ordinate indicates the width W_HDIi. The unit on the axes of ordinate and abscissas is the number of tracks (cylinders). A straight line 110 is indicative of the relationship between the width W_HDIi and the width W_MBSj, that is, W_HDIi= W_MBSj.

As is apparent from FIG. 11, although the defect DFG_HDIi and the defect DFG_MBSj are originally a single defect lying at the same position, the width W_HDIi of the defect DFG_HDIi and the width W_MBSj of the defect DFG_MBSj tend to vary depending on the defect detection method. In particular, protruding defects more significantly exhibit the tendency that the width W_HDIi is larger than the width W_MBSj than recessed defects. That is, protruding defects tend to have a greater ratio of the width W_HDIi to the width W_MBSj than recessed defects.

FIG. 12 is a graph showing a plot of the width W_MBSj, the width W_HDIi, and the ratio of the width W_HDIi to the width W_MBSj (that is, W_HDIi/W_MBSj) for each of the plurality of protruding defects and the plurality of recessed defects. The width W_MBSj and the width W_HDIi is expressed as the number of tracks (cylinders).

As is apparent from FIG. 12, the ratio is 1 to 2 for recessed defects a1 to a6 and is greater than 4 to 5 for protruding defects b1 to b7. The HDI sensor 123 tends to determine the recessed defects a1 to a6 and the protruding defects b1 to b7 to be wider than the read element 122 in the track direction. This tendency is more significantly exhibited by the protruding defects b1 to b7. The inventor has found that this is because the width $W_{HDIS}$ of the HDI sensor 123 in the track direction (that is, the HDI sensor width) is more than 10 times as large as the width $W_{RE}$ of the read element 122 in the track direction (that is, the read element width). That is, since the HDI sensor width $W_{HDIS}$ is larger than the read element width $W_{RE}$, the HDI sensor 123 is expected to be subjected to interference by the defect even though the track is located away from the original position of the defect. In this case, the degree of the interference varies depending on whether the defect is a recess or a protrusion. Provided that the defect is protruding, the HDI sensor 123 is expected to determine even a track located away from the protruding defect to be defective.

Thus, the HDC 22 is configured to determine whether the defect DFz is a recess or a protrusion in accordance with the ratio W_HDIi/W_MBSj. That is, according to the embodiment, the HDC 22 determines whether the ratio W_HDIi/W_MBSj is greater than 4 (first threshold value) (block A04). In a first case where the ratio W_HDIi/W_MBSj is greater than 4 (Yes in block A04), the HDC 22 determines that the defect DFz is the protruding defect (block A06). Here, the first threshold value (4) is set based on the graph shown in FIG. 12.

In contrast, if the ratio W_HDIi/W_MBSj is not greater than 4 (No in block A04), the HDC 22 proceeds to block A05. In block A05, the HDC 22 determines whether the ratio W_HDIi/W_MBSj is not more than 4 and greater than 1 (second threshold value).

In a second case where the ratio W_HDIi/W_MBSj is not more than 4 and greater than 1 (Yes in block A05), the HDC 22 determines that the defect DFz may be protruding or recessed. In this case, determining whether the defect DF is a recess or a protrusion is difficult. Thus, the HDC 22 determines that the defect DFz is the protruding defect or the recessed defect (block A08).

In contrast, in a third case where the ratio W_HDIi/W_MBSj is not more than 1 (second threshold value) (No in block A05), the HDC 22 determines the defect DFz to be the recessed defect (block A10). Here, the second threshold value (1) is set based on the graph shown in FIG. 12. The first threshold value (4) and the second threshold value (1) are illustrative, and any threshold values may be used provided that the first threshold value is greater than the second threshold value. Furthermore, the first and second threshold values may be set, for example, for each magnetic disk drive or each type of magnetic disk drive.

If the defect DFz is the protruding defect, the defect DFz affects an area larger, in an inner circumferential direction and an outer circumferential direction, than the first track area in which the defect DFz is present. The adverse effect of the defect DFz is, for example, an event in which the head 12 fails to write data to the area on the disk 11 where the defect DFz is preset or to read data from the area. The adverse effect is also an event in which the head 12 collides against the defect DFz and is damaged.

Thus, if the HDC 22 determines the defect DFz to be the protruding defect (block A06), the HDC 22 proceeds to block A07. In block A07, the HDC 22 stores a second track area larger than the first track area by a first number of tracks in each of the inner and outer circumferential directions, in the defect list in the FROM 241 as a defect area (block A07).

According to the embodiment, the defect list is referred to as a track slip table. A set of a head number and a cylinder number which is indicative of each of the tracks forming the defect area (in this case, the second track area) is stored in each entry (element) in the track slip table (defect list). This precludes the head 12 from writing data to the second track area and reading data from the second track area, thus allowing the adverse effect of the defect DFz to be prevented. Upon executing block A07, the HDC 22 ends the recess/protrusion determination and defect registration process (block 303). Then, the HDC 22 returns to block 301. For simplification, it is assumed that only the cylinder number is stored in each of the entries (elements) in the track slip table (defect list).

Now, the width of the first track area in the cylinder direction (first area width) is denoted by W1. The width of the second track area in the cylinder direction is denoted by W2. The width W1 of the first track area is equal to the width W_DFz of the defect DFz in the cylinder direction. The width W2 of the second track area (second area width) is larger than the width W1 of the first track area by an amount corresponding to the first number of tracks, in each of the inner circumferential direction of the disk 11 (in the embodiment, the direction in which the cylinder number increases) and the outer circumferential direction of the disk 11 (in the embodiment, the direction in which the cylinder number decreases). An increase in the first number of tracks enhances the effect of avoiding the adverse effect of the defect DFz (that is, the protruding defect) by storing the second track area as the defect area. According to the embodiment, the first number of tracks is 10. Thus, if the cylinder number for the first track area is defined to range from c1 to cn, the cylinder number for the second track area ranges from c1−10 to cn+10. In this case, c1−10, c1−9, ..., c1−1, c1, c2, ..., cn, cn+1, ..., cn+9, cn+10 are stored in the defect list (track slip table).

It is assumed that since the defect DFz may be protruding or recessed, the HDC 22 then determines the defect DFz to be the protruding defect or the recessed defect (block A08). In this case, the HDC 22 assumes that the defect DFz is a slightly protruding defect regardless of the determination in block A08 (block A09). In block A09, the HDC 22 stores a third track area that is larger than the first track area by a second number of tracks in each of the inner and outer circumferential directions of the disk 11, in the defect list (track slip table) in the FROM 241 as the defect area (block A09). Thus, the HDC 22 ends the recess/protrusion determination and defect registration process (block 303). Then, the HDC 22 returns to block 301. Here, even if the defect DFz is the protruding defect, the adverse effect of the defect DFz is less significant than the adverse effect of the protruding defect determined in block A06. Thus, the embodiment sets the second number of tracks to a value smaller than the first number of tracks, for example, 5.

Now, the width of the third track area in the cylinder direction (third area width) is denoted by W3. According to the embodiment, the width W3 of the third track area is larger than the width W1 of the first track area by an amount corresponding to five tracks (second number of tracks), in each of the inner circumferential direction of the disk 11 and the outer circumferential directions of the disk 11. That is, if the cylinder number for the first track area is defined to range from c1 to cn, the cylinder number for the third track area ranges from c1−5 to cn+5. In this case, c1−5, c1−4, ..., c1−1, c1, c2, ..., cn, cn+1, ..., cn+4, cn+5 are stored in the defect list (track slip table).

On the other hand, if the defect DFz is the recessed defect (block A10), the adverse effect of the defect DFz is unlikely to have an adverse effect on an area larger than the first track area where the defect DFz is present. Thus, the HDC 22 stores the first track area in the defect list (track slip table) in the FROM 241 as the defect area (block A11). In this case, c1, c2, ..., cn are stored in the defect list (track slip table). Upon executing block A11, the HDC 22 ends the recess/protrusion determination and defect registration process (block 303). Then, the HDC 22 returns to block 301.

The conventional technique fails to utilize a mechanism for determining whether the defect DFz is a recess or a protrusion. Thus, the conventional technique treats the defect DFz as a protruding defect with the most significant effect as determined in block A06. Hence, according to the conventional technique, even if the defect DFz is a slightly protruding defect or a recessed defect, a track area sufficiently larger than the first area where the defect DFz is present (this track area corresponds to the second track area according to the embodiment) is stored as the defect area. The slightly protruding defect only insignificantly affects the outside of the first track area, and the recessed defect is unlikely to affect the outside of the first track area. The defect area is known as what is called a track slip area to which no logical block address is assigned (that is, which is not used for data writes or reads). The conventional technique is likely to involve frequent registrations of defect areas made larger than required in the track direction even for disks with a large number of recessed defects, which are unlikely to degrade the disk by collisions. Thus, the conventional technique may fail to achieve an intended disk capacity.

In contrast, the embodiment determines the degree to which the defect area is made larger in accordance with the result of the determination of whether the defect DFz is a recess or a protrusion. Thus, the embodiment can prevent an area unlikely to affect the disk from being stored as a part of the defect area. That is, the embodiment can avoid a decrease in disk capacity as a result from making the defect area larger than necessary, while preventing the adverse effect of the defect area. Consequently, if the defect detection and recess/protrusion determination process the procedure of which is shown in the flowcharts in FIG. 2 and FIG. 3 is applied to steps of manufacturing a magnetic drive, manufacturing yield can be improved. The defect detection and recess/protrusion determination process may be implemented by a dedicated magnetic disk inspection apparatus.

The embodiment determines the range of the defect area in accordance with the state of the defect DFz (more specifically, the ratio of the widths of the defects DFG_MBSj and DFG_HDIi corresponding to the defect DFz). The defect area is the first track area where the defect DFz is present, the second area larger than the first track area, or the third track area larger than the first track area and smaller than the second track area. However, if the defect DFz is a slightly protruding defect, the defect DFz (more specifically, the defect DFG_HDIi) is determined by the HDI sensor 123 to be larger. Thus, even if the defect DFz is a slightly protruding defect, the first track area may be stored as the defect area as is the case where the defect DFz is determined to be recessed in block A10.

Furthermore, the defect area need not be stored in units of tracks. For example, if the defect DFz is a protruding defect, the first area on the disk 11 where the defect DFz is present may be made larger in the track direction and the sector direction by an amount corresponding to the state of the defect DFz, and the resulting second area may be stored as the defect area. Likewise, if the defect DFz is a recessed defect, the first area may be stored as the defect area.

Additionally, the HDI sensor 123 applied according to the embodiment comprises the MR element to electrically detect the thermal interference acting between the HDI sensor 123 (the head 12 comprising the HDI sensor 123) and the disk 11. However, the HDI sensor 123 may be, for example, a pressure sensor comprising a piezoelectric element that electrically detects pressure acting between the HDI sensor 123 and the disk 11.

At least one of the above-described embodiments can provide a defect recess/protrusion determination method and a magnetic disk drive which allow the determination of whether a defect on a disk is a recess or a protrusion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for determining whether a defect on a disk in an apparatus comprising head is a recess or a protrusion, the method comprising:
    detecting a first defect on the disk using a read element provided in the head;
    detecting a second defect on the disk using a head disk interference sensor provided in the head; and
    determining whether a third defect is a recessed defect or a protruding defect based on a ratio between a first width of the first defect in a radial direction on the disk and a second width of the second defect in the radial direction of the disk, the third defect being identified based on the first defect and the second defect.

2. The method of claim 1, wherein a third width of the read element in the radial direction is different from a fourth width of the head disk interference sensor in the radial direction.

3. The method of claim 2, wherein the fourth width is larger than the third width.

4. The method of claim 3, wherein:
the third defect is determined to be the protruding defect if the ratio of the second width to the first width is greater than a first threshold value; and
the third defect is determined to be the recessed defect if the ratio is smaller than a second threshold value smaller than a first threshold value.

5. The method of claim 2, wherein:
the third defect is determined to be the protruding defect if the ratio of the second width to the first width is greater than a first threshold value; and
the third defect is determined to be the recessed defect if the ratio is smaller than a second threshold value smaller than a first threshold value.

6. The method of claim 1, wherein:
the third defect is determined to be the protruding defect if the ratio of the second width to the first width is greater than a first threshold value; and
the third defect is determined to be the recessed defect if the ratio is smaller than a second threshold value smaller than a first threshold value.

7. The method of claim 1, further comprising determining a defect area on the disk which corresponds to the third defect and for which read or write is to be avoided, based on a result of the determination.

8. The method of claim 7, wherein a second area width of the defect area in the radial direction which is determined if the third defect is determined to be the recessed defect is smaller than a first area width of the defect area in the radial direction which is determined if the third defect is determined to be the protruding defect.

9. A magnetic disk drive comprising:
a head comprising a read element for reading data magnetically written to a disk;
a head interference sensor for electrically detecting interference acting between the disk and the head and provided in the head;
a first defect defector configured to detect a first defect on the disk using the read element;
a second defect detector configured to detect a second defect on the disk using the head disk interference sensor; and
a defect recess/protrusion determination module configured to determine whether a third defect is a recessed defect or a protruding defect based on a ratio between a first width of the first defect in a radial direction on the disk and a second width of the second defect in the radial direction of the disk, the third defect being identified based on the first defect and the second defect.

10. The magnetic disk drive of claim 9, wherein a third width of the read element in the radial direction is different from a fourth width of the head disk interference sensor in the radial direction.

11. The magnetic disk drive of claim 10, wherein the fourth width is larger than the third width.

12. The magnetic disk drive of claim 11, wherein the defect recess/protrusion determination module is further configured:
to determine that the third defect is the protruding defect if the ratio of the second width to the first width is greater than a first threshold value; and
to determine that the third defect is the recessed defect if the ratio is smaller than a second threshold value smaller than a first threshold value.

13. The magnetic disk drive of claim 10, wherein the defect recess/protrusion determination module is further configured:
to determine that the third defect is the protruding defect if the ratio of the second width to the first width is greater than a first threshold value; and
to determine that the third defect is the recessed defect if the ratio is smaller than a second threshold value smaller than a first threshold value.

14. The magnetic disk drive of claim 9, wherein the defect recess/protrusion determination module is further configured:
to determine that the third defect is the protruding defect if the ratio of the second width to the first width is greater than a first threshold value; and
to determine that the third defect is the recessed defect if the ratio is smaller than a second threshold value smaller than a first threshold value.

15. The magnetic disk drive of claim 9, further comprising a determination module configured to determine a defect area on the disk which corresponds to the third defect and for which read or write is to be avoided, based on a result of the determination.

16. The magnetic disk drive of claim 15, wherein a second area width of the defect area in the radial direction which is determined if the third defect is determined to be the recessed defect is smaller than a first area width of the defect area in the radial direction which is determined if the third defect is determined to be the protruding defect.

* * * * *